(12) United States Patent
Sheikman et al.

(10) Patent No.: US 8,344,741 B2
(45) Date of Patent: Jan. 1, 2013

(54) SYSTEMS, METHODS, AND APPARATUS FOR MONITORING CLEARANCE IN A ROTARY MACHINE

(75) Inventors: Boris Sheikman, Minden, NV (US); Jack E. Howard, Gardnerville, NV (US); Brandon Rank, Minden, NV (US); Raymond Verle Jensen, Gardnerville, NV (US)

(73) Assignee: General Electric Company, Schenectady, NY (US)

( * ) Notice: Subject to any disclaimer, the term of this patent is extended or adjusted under 35 U.S.C. 154(b) by 330 days.

(21) Appl. No.: 12/252,435

(22) Filed: Oct. 16, 2008

(65) Prior Publication Data
US 2010/0097079 A1  Apr. 22, 2010

(51) Int. Cl.
*G01R 27/26* (2006.01)
(52) U.S. Cl. .......... 324/686; 324/658; 324/662; 73/660; 415/14; 702/158
(58) Field of Classification Search .............. 324/686
See application file for complete search history.

(56) References Cited

U.S. PATENT DOCUMENTS

| | | | |
|---|---|---|---|
| 4,325,234 A * | 4/1982 | Toma ............................. | 68/133 |
| 4,654,603 A | 3/1987 | Cox | |
| 4,766,368 A | 8/1988 | Cox | |
| 4,847,556 A | 7/1989 | Langley | |
| 4,924,172 A | 5/1990 | Holmgren | |
| 4,941,105 A * | 7/1990 | Marangoni ...................... | 702/42 |
| 5,295,388 A * | 3/1994 | Fischer et al. ................ | 73/12.09 |
| 5,295,915 A * | 3/1994 | Friedmann ...................... | 474/18 |
| 5,497,101 A * | 3/1996 | Fillion ........................... | 324/662 |
| 5,760,593 A * | 6/1998 | Lawrence et al. ............. | 324/662 |
| 5,960,671 A * | 10/1999 | Nguyen ........................... | 74/397 |
| 6,164,132 A * | 12/2000 | Matulek ...................... | 73/304 C |
| 6,346,807 B1 | 2/2002 | Slates | |
| 6,664,782 B2 | 12/2003 | Slates | |

(Continued)

FOREIGN PATENT DOCUMENTS
EP  1870987 A1  12/2007

OTHER PUBLICATIONS

"4000 Series Air Gap 50 mm Sensor System—Specifications and Ordering Information," Bently Nevada, Part No. 167885-01, Revision B, Nov. 2005, pp. 1-11.

(Continued)

*Primary Examiner* — Timothy J Dole
*Assistant Examiner* — Benjamin M Baldridge
(74) *Attorney, Agent, or Firm* — Sutherland Asbill & Brennan LLP

(57) ABSTRACT

Systems, methods, and apparatus for monitoring clearance in a rotary machine are provided. According to one embodiment of the invention, there is disclosed a method for monitoring clearance between a rotatable member and a stationary member in a rotary machine. The method may include providing a flex circuit capacitance sensor. The flex circuit capacitance sensor may include at least one capacitance sensing layer, at least one shielding layer adjacent to the capacitance sensing layer, at least one ground layer adjacent to the shielding layer, and a set of conducting leads connected to the capacitance sensing layer. Further, the method may include mounting the capacitance sensor between a portion of the rotatable member and a portion of the stationary member. Clearance may be determined between the rotatable member and the stationary member based at least in part on a capacitance indication from the capacitance sensor.

5 Claims, 13 Drawing Sheets

U.S. PATENT DOCUMENTS

| | | | |
|---|---|---|---|
| 6,724,324 B1 | 4/2004 | Lambert | |
| 6,727,688 B2 | 4/2004 | Slates | |
| 6,765,395 B2 | 7/2004 | Slates | |
| 6,798,194 B2 | 9/2004 | Slates | |
| 6,819,122 B2 | 11/2004 | Slates | |
| 6,842,020 B2 | 1/2005 | Slates | |
| 6,847,217 B2 | 1/2005 | Slates | |
| 6,848,193 B1* | 2/2005 | Kirzhner | 33/833 |
| 6,892,590 B1* | 5/2005 | Andermo | 73/862.626 |
| 6,949,939 B2 | 9/2005 | Kirzhner | |
| 6,989,679 B2 | 1/2006 | Lieder et al. | |
| 7,084,643 B2 | 8/2006 | Howard et al. | |
| 7,256,588 B2 | 8/2007 | Howard et al. | |
| 7,582,359 B2* | 9/2009 | Sabol et al. | 428/469 |
| 2002/0149572 A1* | 10/2002 | Schulz et al. | 345/174 |
| 2003/0214310 A1* | 11/2003 | McIntosh | 324/658 |
| 2003/0215323 A1* | 11/2003 | Prinz et al. | 415/14 |
| 2005/0257628 A1* | 11/2005 | Nikaido et al. | 73/862.541 |
| 2006/0272782 A1* | 12/2006 | Nichols et al. | 160/120 |
| 2007/0290873 A1 | 12/2007 | Jensen | |
| 2007/0292260 A1* | 12/2007 | Bagepalli et al. | 415/14 |
| 2009/0281766 A1* | 11/2009 | Chan et al. | 702/158 |
| 2010/0089166 A1* | 4/2010 | Zielinski et al. | 73/660 |

OTHER PUBLICATIONS

"Flex Circuits Design Guide," Precision Flexible Circuitry for Medical Implants & Diagnostics, Defense, Aerospace & Other Critical Applications Design Guidelines for Highly Reliable Flexible Printed Circuits Optimized for Manufacturability, MINCO, (32 pages), Copyright Minco 2007.

"BTC™-Turbine Clearance Measurements," ViBroSystM, Innovative Measuring & Monitoring Solutions for Large Rotating Machines, ISO 9001, (1 page), Copyright 2006 VibroSystM Inc.

* cited by examiner

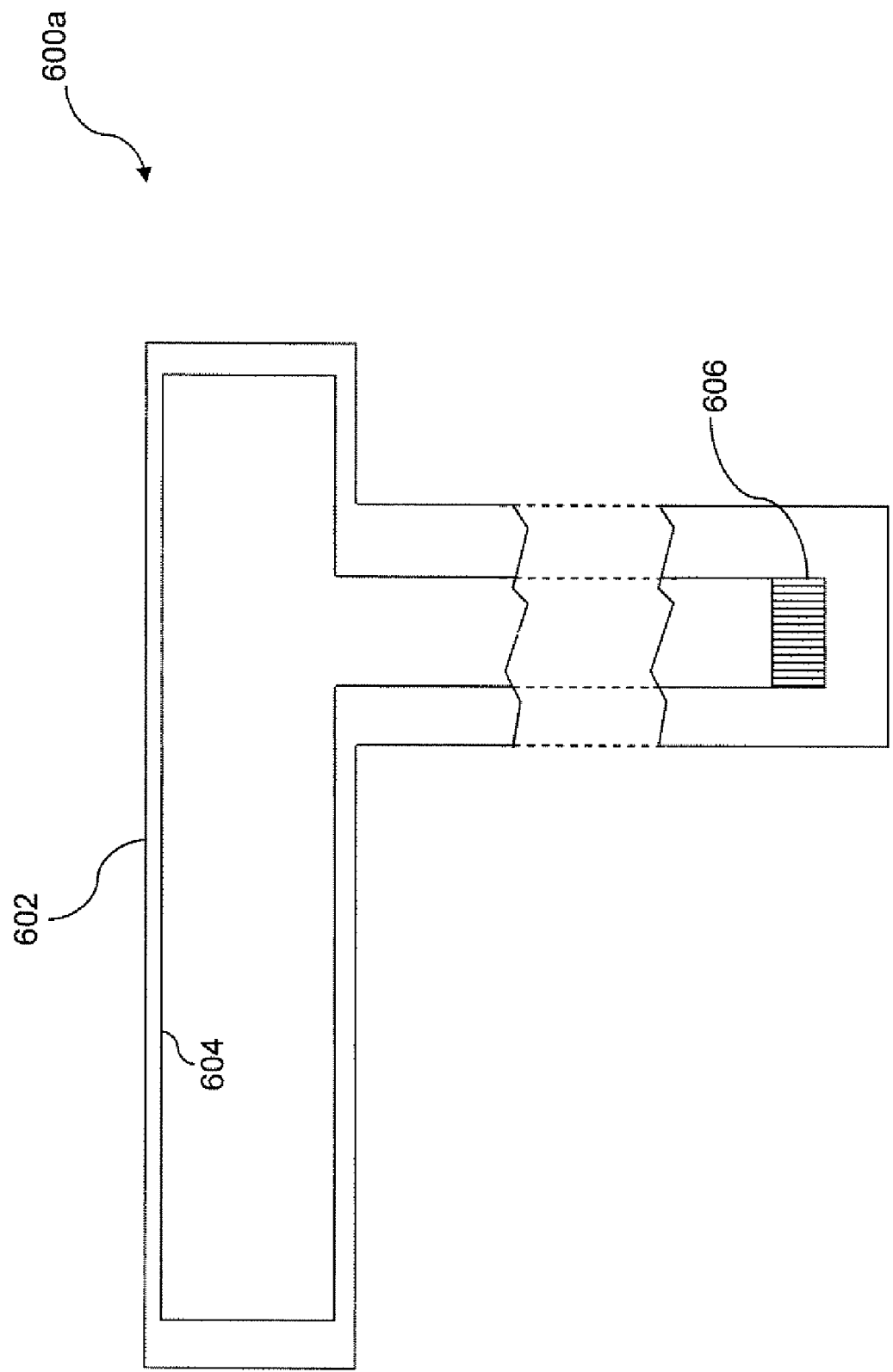

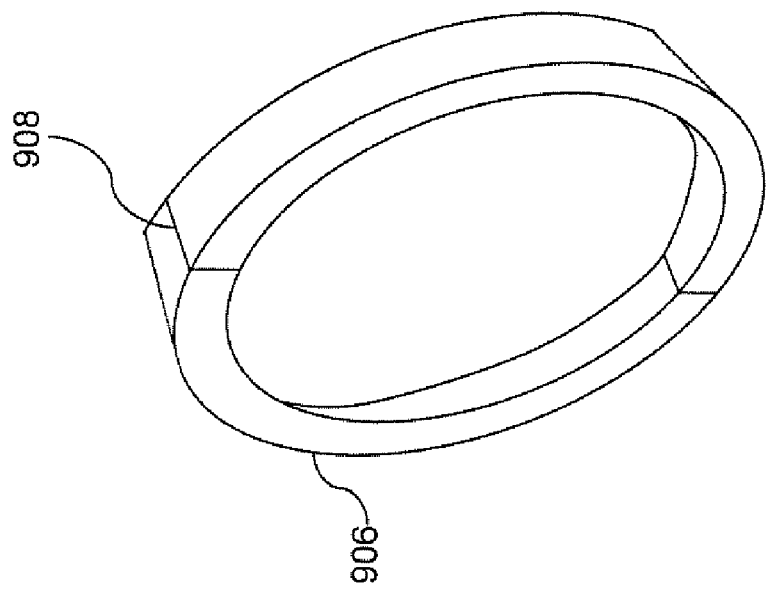
FIG. 9B
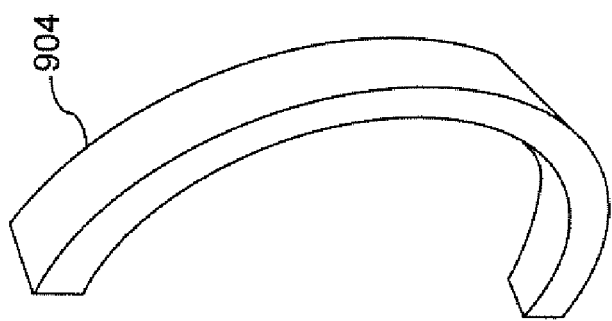
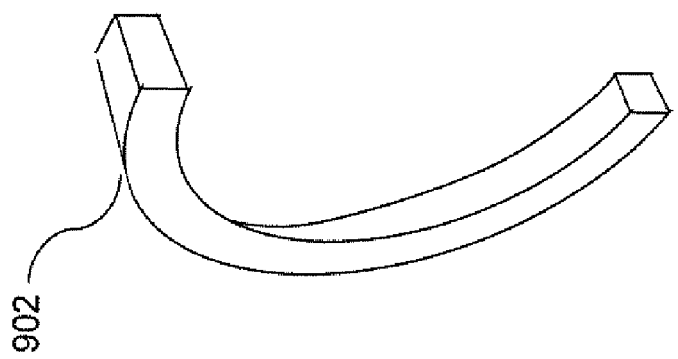
FIG. 9A

SYSTEMS, METHODS, AND APPARATUS FOR MONITORING CLEARANCE IN A ROTARY MACHINE

FIELD OF THE INVENTION

This invention relates generally to rotary machines and more specifically, to providing systems, methods, and apparatus for monitoring clearance in a rotary machine.

BACKGROUND OF THE INVENTION

Rotary machines are utilized in a variety of power generation and energy conversion applications. A rotary machine in general may include a stationary or fixed member enclosing a rotatable member. The rotatable member can be actuated by the force of a fluid such as water or hot gases. In a conventional rotary machine, such as a hydraulic turbine, the rotatable member includes turbine blades which are circumferentially surrounded by a stationary shroud.

A clearance is provided between the shroud and tips of the turbine blades to avoid any damage to the turbine blades and the shroud walls during operation of the turbine. A large clearance may lead to inefficiency of the turbine while a small clearance may increase the chances of the blades hitting the shroud during operation, resulting in damage to the shroud and/or the blades. Therefore, a uniform clearance has to be maintained between the turbine blades and the shroud. Continuous monitoring of the clearance and maintaining a uniform clearance is necessary for efficient and reliable operation of the rotary machine.

One of the existing solutions uses a capacitive sensor for clearance monitoring in rotary machines. The capacitive sensor determines the clearance between the turbine blades and the shroud. Additionally, the sensor may provide this information to a device or an operator to take appropriate actions and achieve uniform clearance. Typically, a long drilling machine is used to drill a hole through the concrete and/or metal of the shroud wall to install the sensor. The sensor can then be threaded into this hole. However, the installation of the sensor by drilling a hole is difficult, time consuming, and can weaken the shroud wall. Other methods utilize sensor assemblies that can mount to the shroud wall, but the sensor may protrude from the shroud wall due to the thickness and the inflexible design of the sensor. The inflexible design is attributed to manufacturing of the sensor on a rigid substrate and on the sensor housing. Mounting a thick and inflexible sensor into an already narrow gap between the turbine blade and the shroud wall may increase the risk of the turbine blade striking and damaging the sensor. Furthermore, if the gap between the turbine blade and the shroud is increased to accommodate the thickness of the sensor, the gap may be too large for optimum performance of the turbine.

FIG. 1 is a schematic representation of an example prior art turbine apparatus 100. The prior art turbine apparatus 100 is a vertically arranged hydraulic turbine such as a Kaplan turbine 100 that may be used in a high-flow, low-head power production. The Kaplan turbine 100 is an inward flow reaction turbine, which means that the pressure of the working fluid changes with its passage through the Kaplan turbine 100 and thus produces energy. The Kaplan turbine 100 includes an inlet 102, which may be a scroll-shaped tube that wraps around wicket gates 104 of the Kaplan turbine 100. Water may be directed tangentially, through these wicket gates 104, and further spirals on to turbine blades 106, causing the turbine blades 106 to spin. The turbine blades 106 act as a rotatable member in the Kaplan turbine 100. Also, shroud walls 108 that act as the stationary member in the Kaplan turbine 100 circumferentially surround the turbine blades 106. The shroud walls 108 are usually made up of steel surrounded by concrete that may be 1 to 3 meters thick. Further, the Kaplan turbine 100 includes an outlet 110 that may be a specially shaped draft tube that helps to decelerate the water and recover kinetic energy.

Ideally, the space between a tip of the turbine blades 106 and the shroud walls 108 should be zero (hereinafter referred to as zero clearance). The clearance is a space through which some water may pass without hitting the turbine blades 106. As a result, the operation of the Kaplan turbine 100 may be inefficient. However, practically the zero clearance has some limitations as even a slightest vibration in a turbine shaft may cause the turbine blades 106 to hit the shroud walls 108. Thus, a small and uniform clearance is essential between the turbine blades 106 and the shroud walls 108. Typically, a clearance of about 5 to about 10 millimeters may be maintained to achieve relatively efficient working and operational safety of the Kaplan turbine 100.

Therefore, a continuous monitoring of the clearance between the shroud walls 108 and the turbine blades 106 is required for efficient and reliable operation of the Kaplan turbine 100. Any number of sensors may be used in the Kaplan turbine 100 to monitor clearance between the shroud walls 108 and the turbine blades 106. For this purpose, as shown in the FIG. 1, a sensor 112 may be used in the Kaplan turbine 100. The sensor 112 may be a capacitive water gap sensor. Moreover, the capacitance sensors can also be used to measure presence, density, thickness, and location of other conducting members. However, one of the drawbacks associated with the capacitive sensor 112 that is mounted in the hole drilled through the shroud, as shown in FIG. 1, is that it usually requires the removal of extra metal around the drilled hole, otherwise the probes will be "side loaded" and their effective range will be reduced. Typically, a long drilling machine may be used to drill a hole 114 through concrete and/or metal of the shroud walls 108 to install the sensor 112. The sensor 112 may then be threaded into this hole 114. The sensor 112 may also be covered with a sealant.

The Kaplan turbine 100 may further include sensor leads 116 such as a set of cables that connect the sensor 112 to a measurement conversion and/or read-out device. As shown in the FIG. 1, the device may be a monitoring system 118 that receives monitored information from the sensor 112. The monitoring system 118 may then perform necessary actions using the monitored information to achieve a uniform clearance between the turbine blade 106 and the shroud walls 108. The uniform clearance may lie within a pre-defined minimum and maximum range specified by an operator of the Kaplan turbine 100.

FIG. 2 is a schematic representation of another example prior art system 200 for clearance monitoring. As shown in the FIG. 2, a clearance 202 is provided between a turbine blade 204 and a shroud surface 206 (a portion of shroud walls 214). In this example prior art system 200, a sensor 216 is installed along a sidewall of the shroud surface 206. The sensor 216 may monitor the clearance 202 between the shroud surface 206 and the turbine blade 204. The sensor 216 may also be covered with a sealant that may not interfere during the clearance measurement.

The example prior art system 200 may further include sensor leads 208 that connect the sensor 216 to a monitoring system 210 that receives monitored information from the sensor 216. The sensor leads 208 may be a set of cables that may route through an exit hole 212, located below the turbine blade 204, to the monitoring system 210. The functioning of the monitoring system 210 may be same as the functioning of the monitoring system 118 described earlier in conjunction with the FIG. 1.

Each of the prior art clearance measurement systems, as explained above in conjunction with FIGS. 1 and 2, suffer from installation difficulties, or from non-optimal operation of the turbine. For example, the thickness and rigidity of the sensor 206 in FIG. 2 requires that the gap 202 must be greater than the thickness of the sensor 206 to avoid damaging the sensor. Therefore, if the sensor 206 is too thick, the operator will not install the sensor, and it is highly unlikely that the turbine blades would be trimmed to accommodate a thick sensor. If the thick sensor does manage to fit in the gap between the turbine blades and the shroud wall, the gap clearance will be reduced, and there will be an increased risk of impact.

Accordingly, there is a need for systems, methods, and apparatus for monitoring clearance in a rotary machine. Additionally, there is a need for systems, methods, and apparatus for monitoring clearance between a rotatable member and a stationary member in a rotary machine.

BRIEF DESCRIPTION OF THE INVENTION

According to one embodiment of the invention, there is disclosed a method for monitoring clearance between a rotatable member and a stationary member in a rotary machine. The method may include providing a flex circuit capacitance sensor. The flex circuit capacitance sensor may include at least one capacitance sensing layer, at least one shielding layer adjacent to the capacitance sensing layer, at least one ground layer adjacent to the shielding layer, and a set of conducting leads connected to the capacitance sensing layer. The method may further include mounting the capacitance sensor between a portion of the rotatable member and a portion of the stationary member. Clearance may be determined between the rotatable member and the stationary member based at least in part on a capacitance indication from the capacitance sensor.

According to another embodiment of the invention, there is disclosed a system for monitoring clearance between a rotatable member and a stationary member in a rotary machine. The system may include at least one flex circuit capacitance sensor disposed between the stationary member and the rotatable member. The capacitance sensor may be operable to generate an indication of a clearance between the stationary and rotatable members. The system may further include at least one capacitance measurement circuit connected to the flex circuit capacitance sensor. The capacitance measurement circuit may be operable to output a clearance measurement.

According to yet another embodiment of the invention, an apparatus for monitoring clearance between a rotatable member and a stationary member in a rotary machine is disclosed. The apparatus may include a flex circuit capacitance sensor that is operable to be mounted to either the stationary member or the rotatable member. The flex circuit capacitance sensor may include a plurality of flexible layers. The flexible layers may include at least one capacitance sensing layer, at least one shielding layer adjacent to the capacitance sensing layer, and at least one ground layer adjacent to the shielding layer. The flexible layers may respectively communicate with at least one conducting lead.

Other embodiments, aspects, and features of the invention will become apparent to those skilled in the art from the following detailed description, the accompanying drawings, and the appended claims.

BRIEF DESCRIPTION OF THE DRAWINGS

Figure 1:
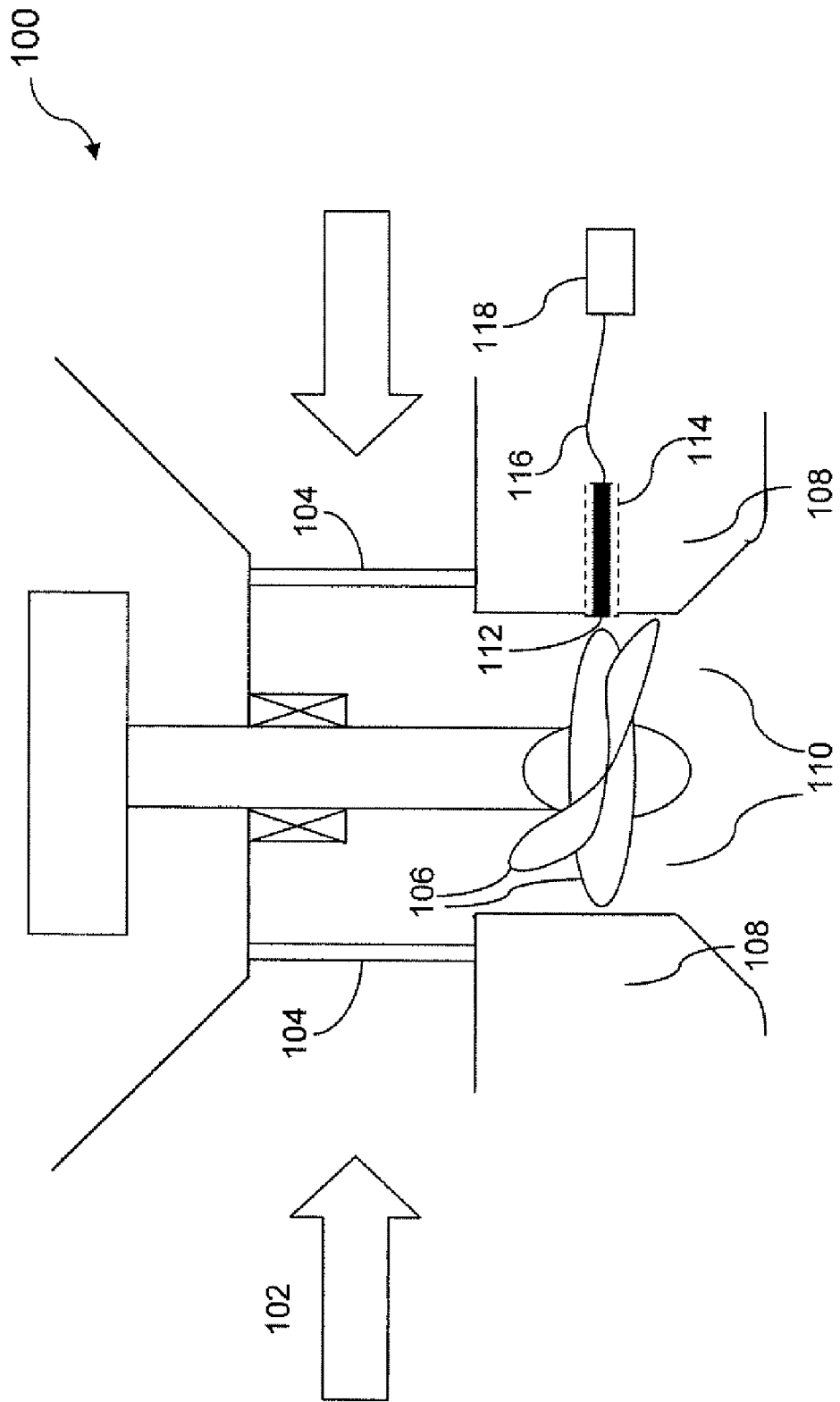

Having thus described the invention in general terms, reference will now be made to the accompanying drawings, which are not necessarily drawn to scale, and wherein:

FIG. 1 is a schematic representation of an example prior art turbine apparatus.

Figure 2:
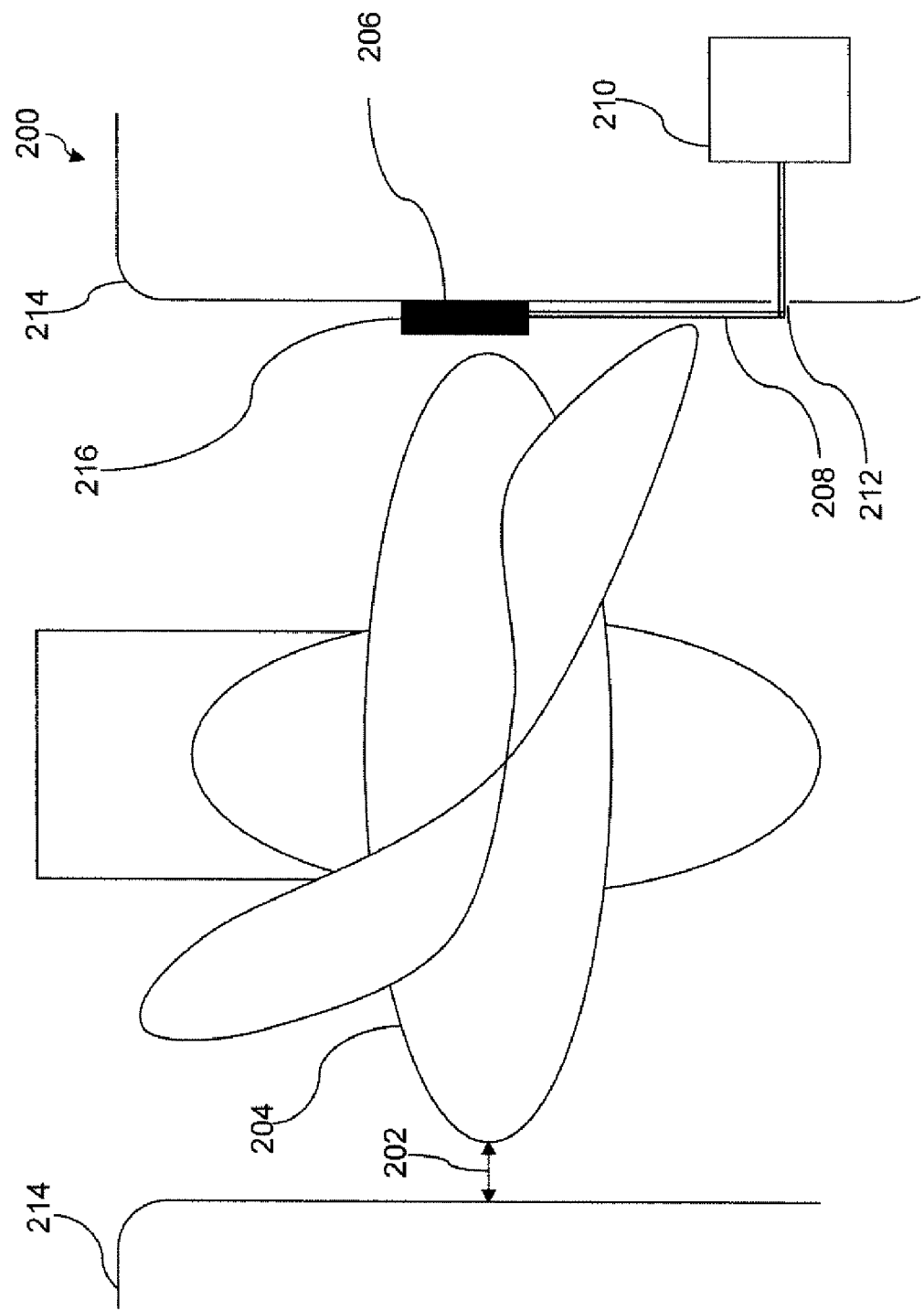

FIG. 2 is a schematic representation of an example prior art system for clearance monitoring.

Figure 3:
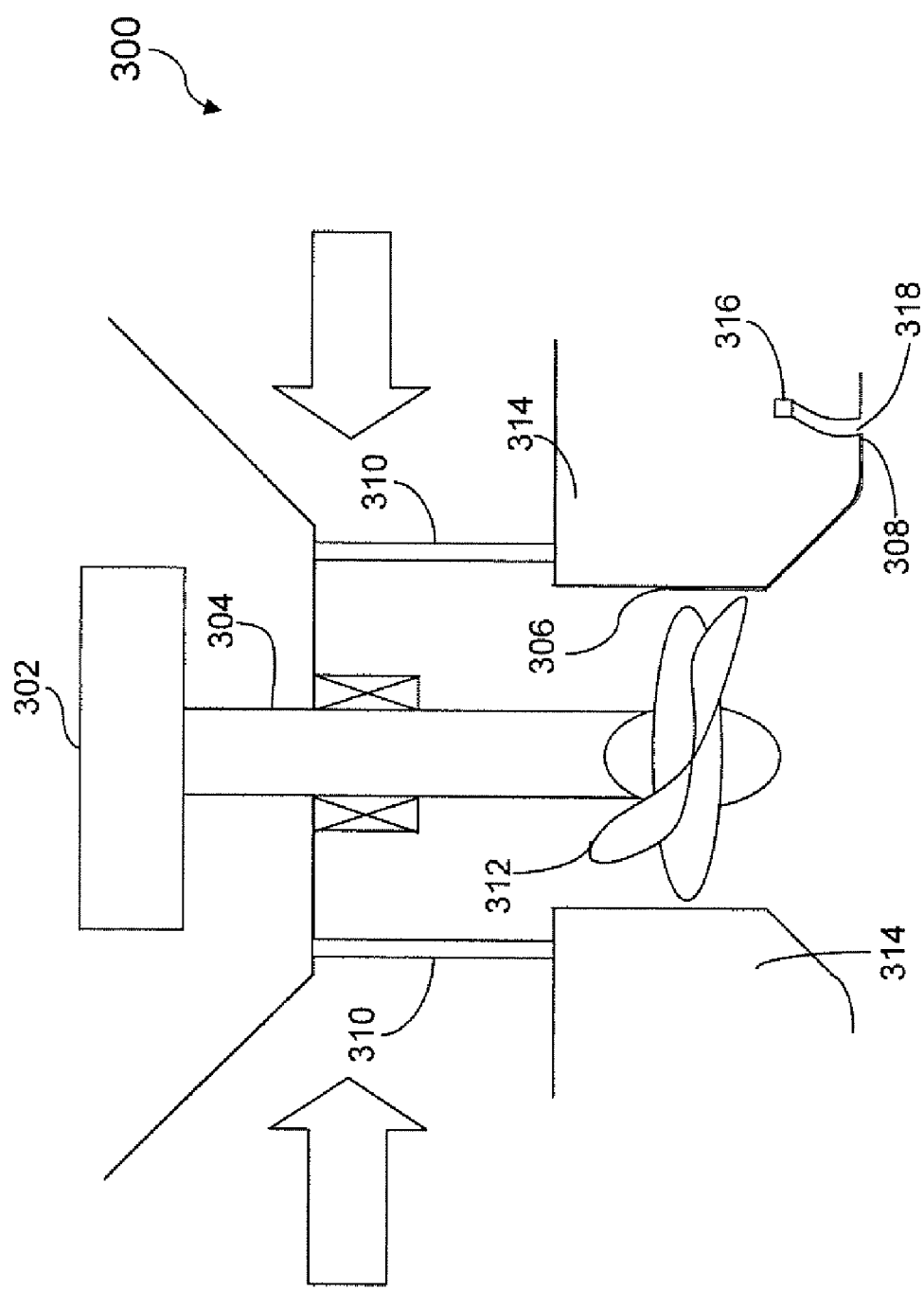

FIG. 3 is a schematic representation of an example system for clearance monitoring according to an illustrative embodiment of the invention.

Figure 4:
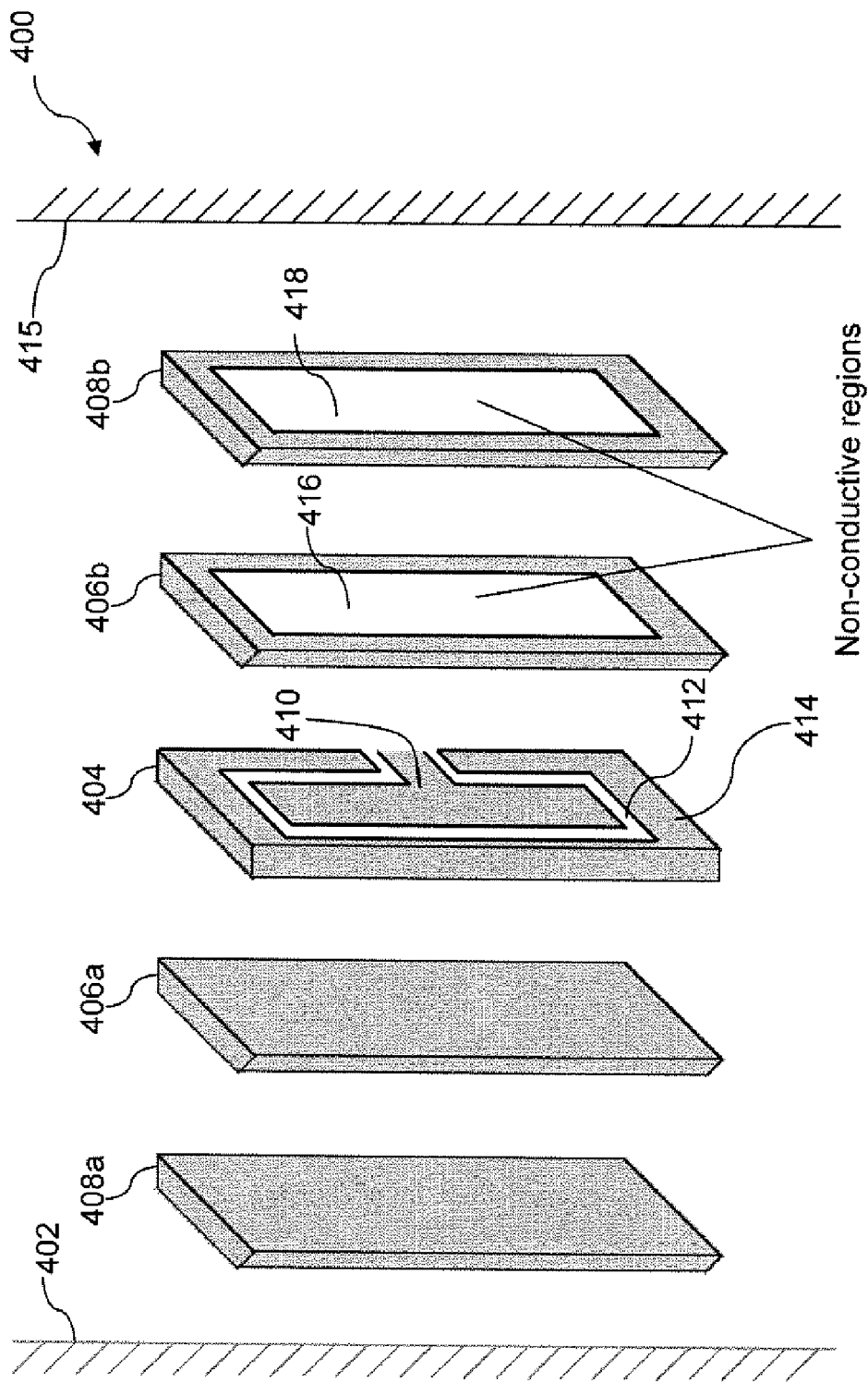

FIG. 4 is a schematic representation of an example sensor system with different sensor layers according to an illustrative embodiment of the invention.

Figure 5:
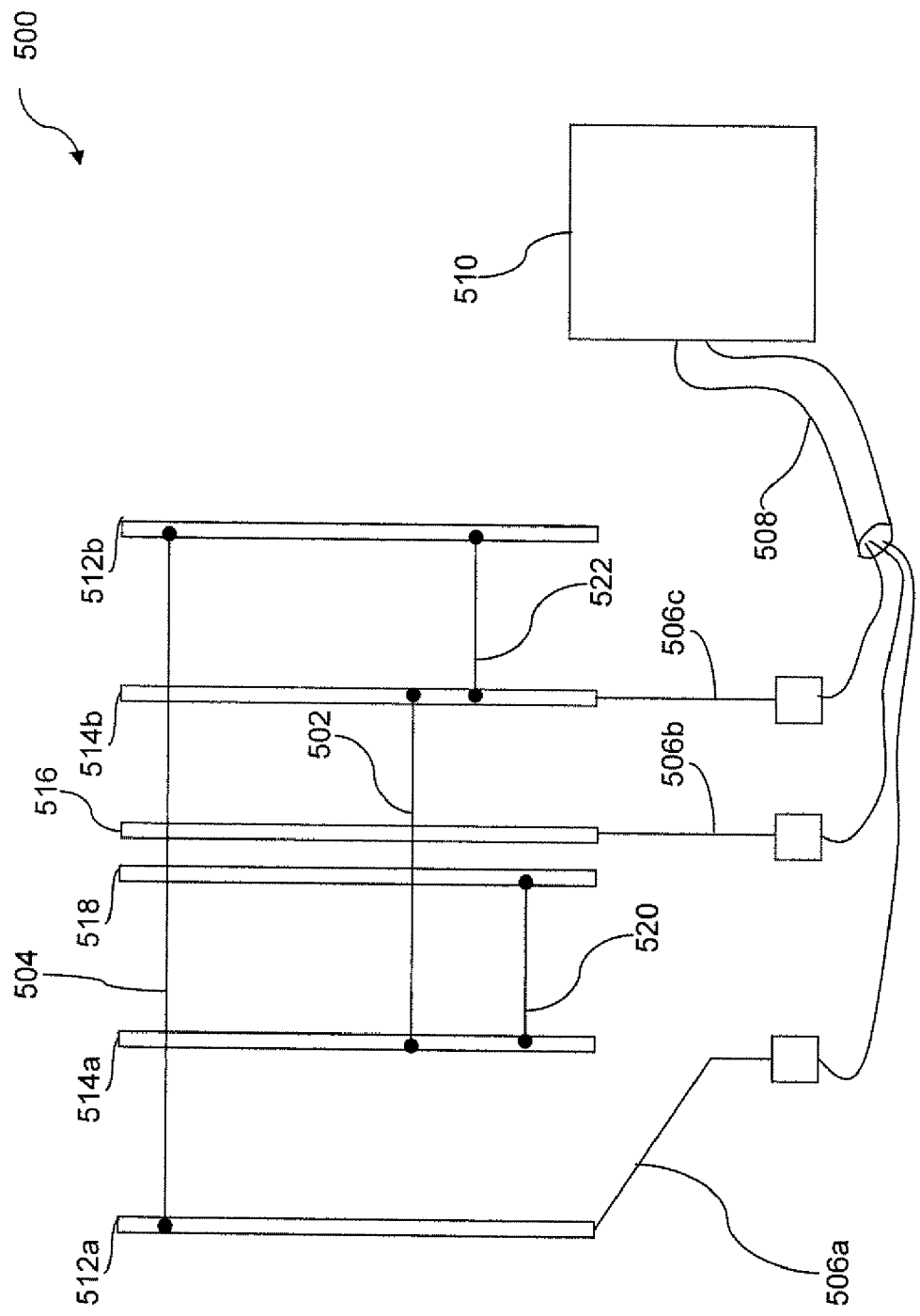

FIG. 5 is a schematic representation of an example sensor system with integrated conducting leads according to an illustrative embodiment of the invention.

FIG. 6A is a schematic representation of an example sensor system where a flex circuit capacitance sensor may be applied to a flat mounting surface according to an illustrative embodiment of the invention.

Figure 6B:
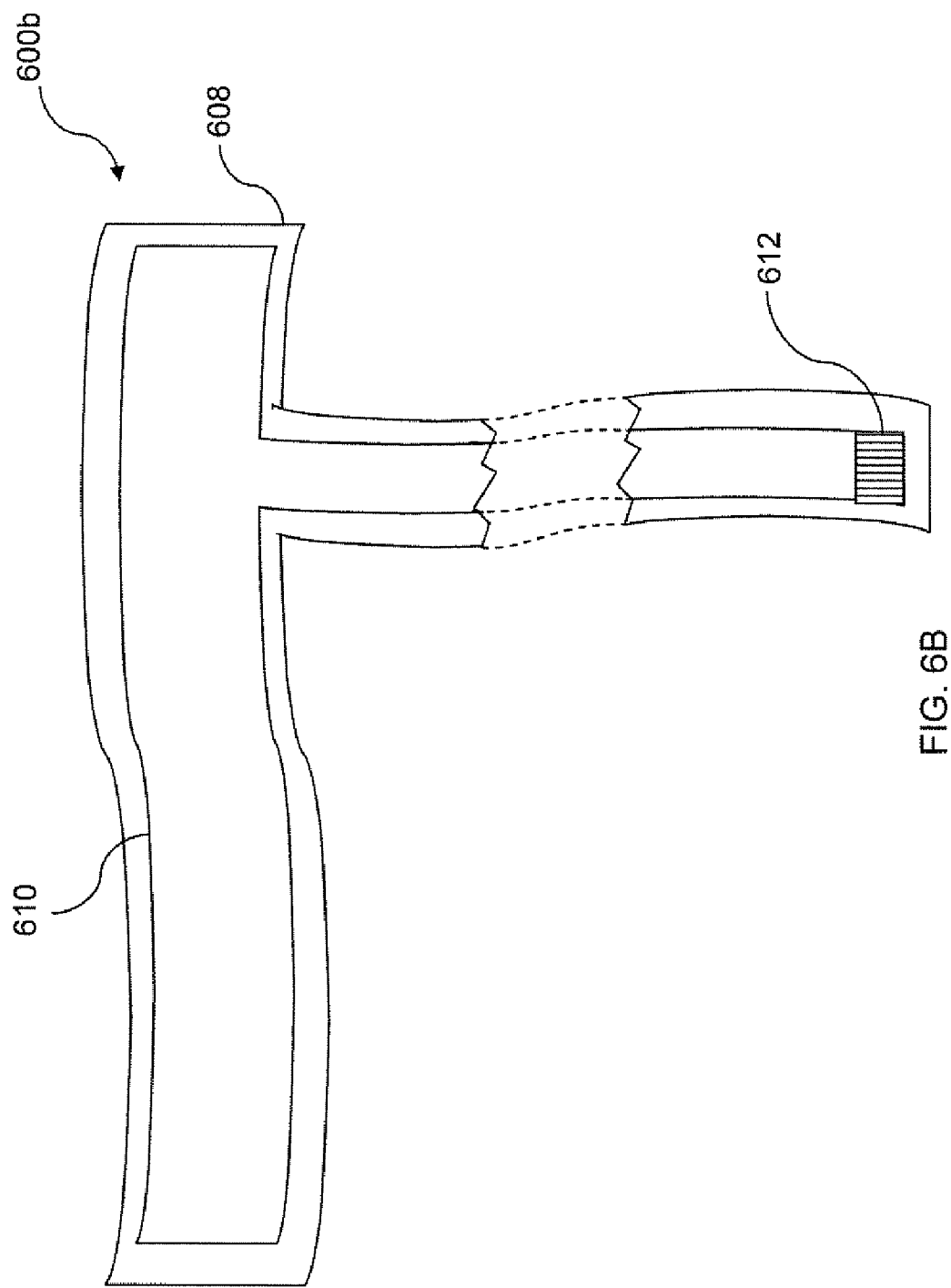

FIG. 6B is a schematic representation of an example sensor system where a flex circuit capacitance sensor may be applied to a curved mounting surface according to an illustrative embodiment of the invention.

Figure 7:
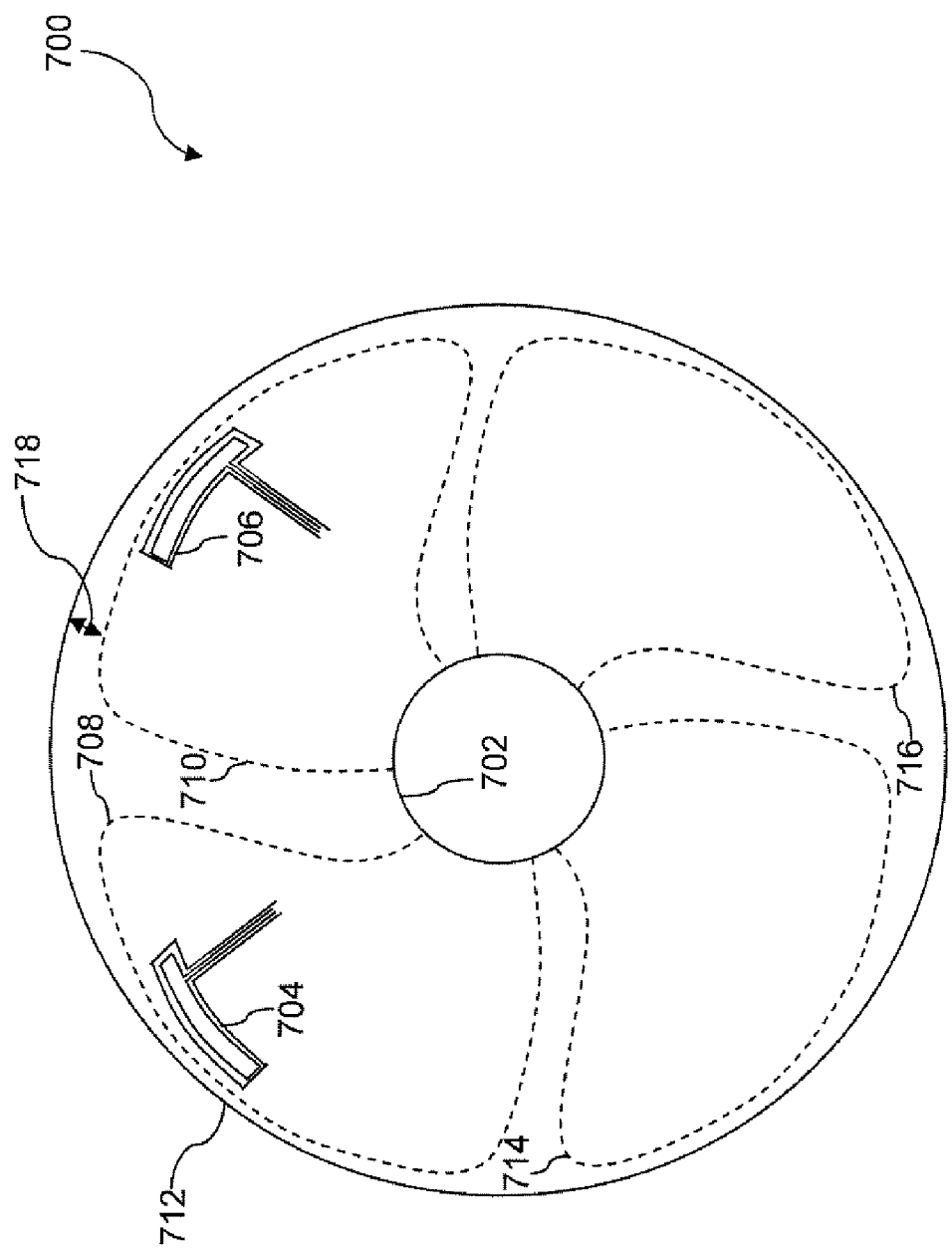

FIG. 7 is a schematic representation of an example turbine system having a plurality of sensors according to an illustrative embodiment of the invention.

Figure 8:
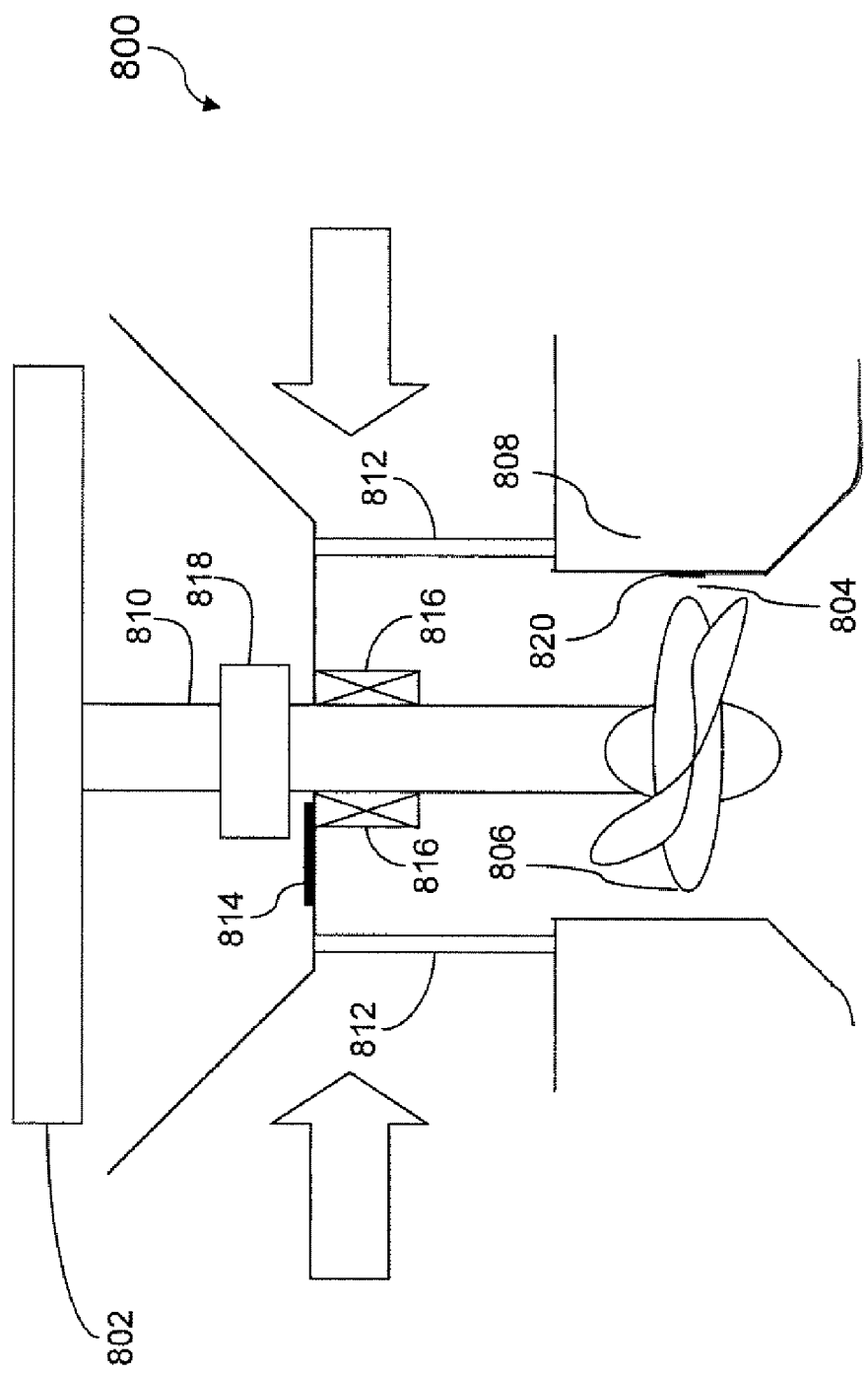

FIG. 8 is a schematic representation of an example sensor mounted on top of a turbine shaft bearing surface according to an illustrative embodiment of the invention.

FIG. 9A is a schematic representation of an example of split rings to be mounted on a turbine shaft according to an illustrative embodiment of the invention.

FIG. 9B is a schematic representation of an example of split rings to be mounted on a turbine shaft according to another illustrative embodiment of the invention.

Figure 10:
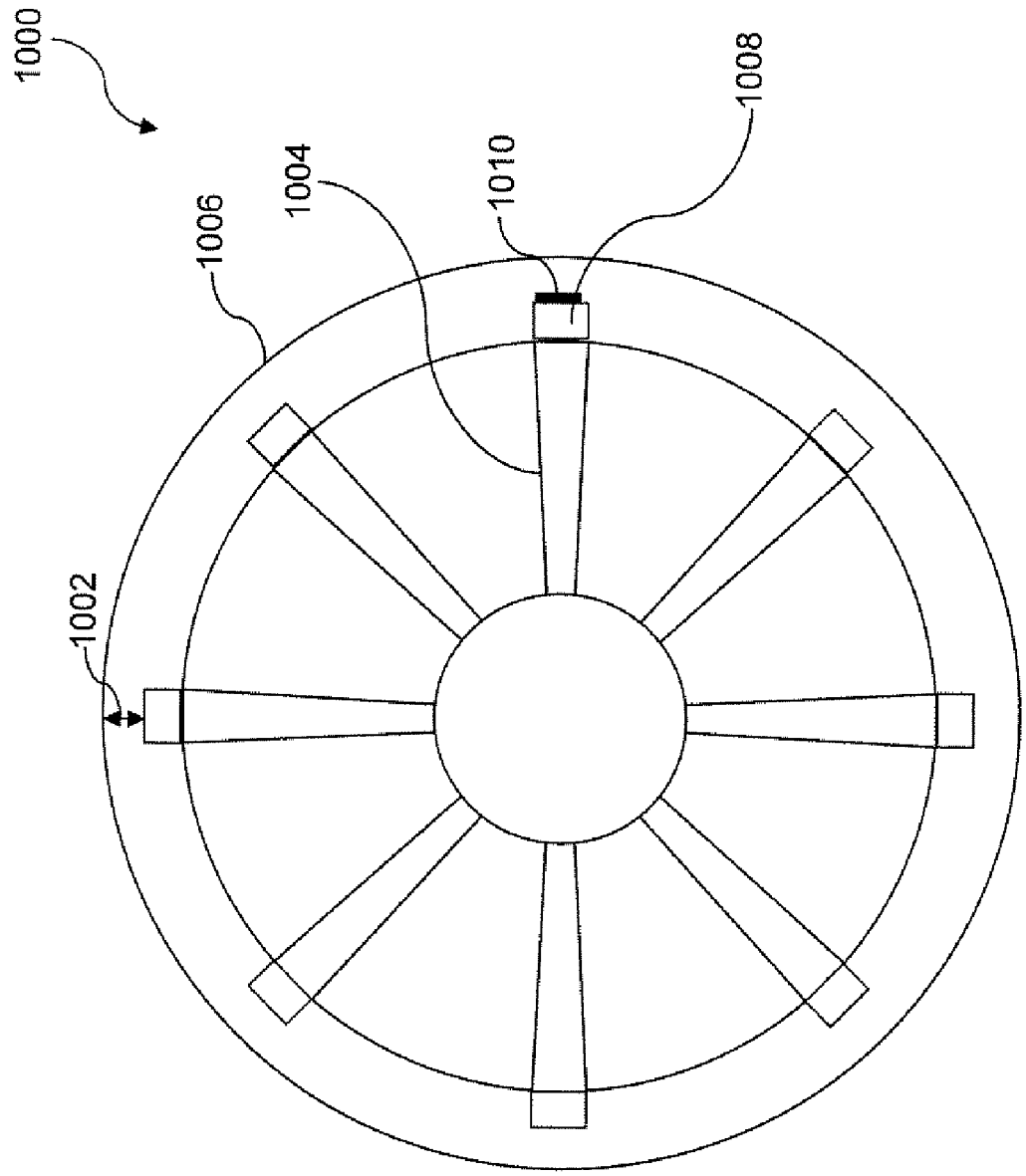

FIG. 10 is a schematic representation of an example rotor-stator assembly according to an illustrative embodiment of the invention.

Figure 11:
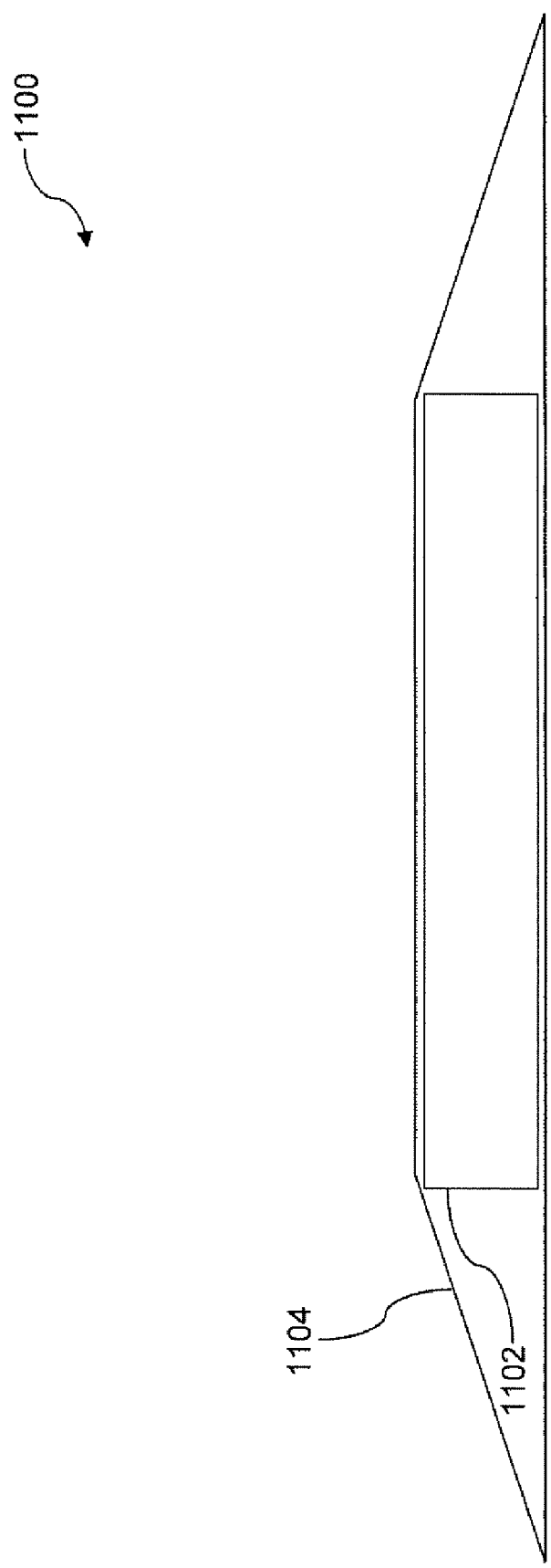

FIG. 11 is an end view of one example of a sensor system mounted on a rotatable member or a stationary member according to an illustrative embodiment of the invention.

Figure 12:
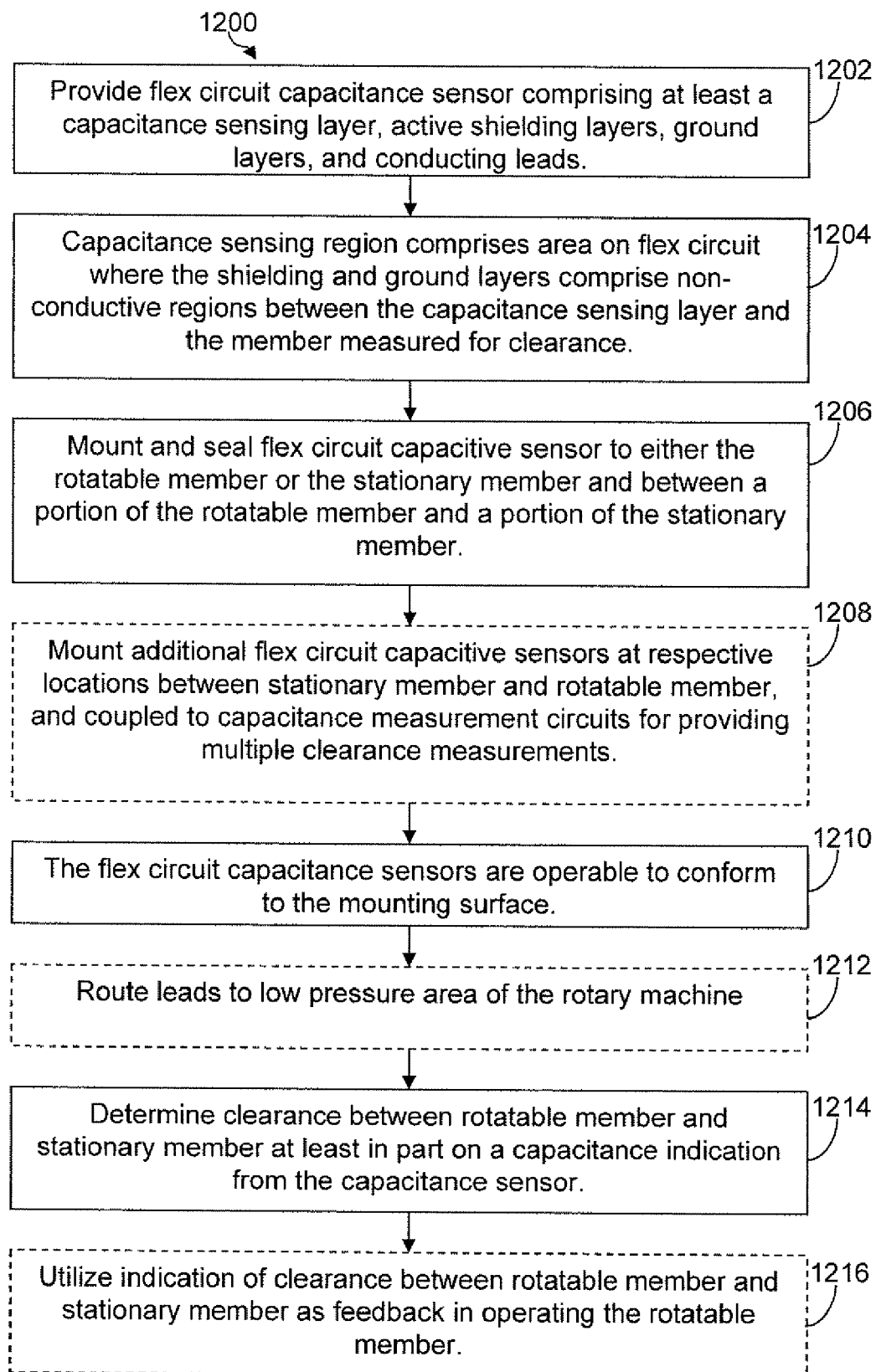

FIG. 12 is a flowchart illustrating one example of a method for monitoring clearance between a rotatable member and a stationary member in a rotary machine according to an embodiment of the invention.

DETAILED DESCRIPTION OF THE INVENTION

Illustrative embodiments of the invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Disclosed are systems, methods, and apparatus for monitoring clearance in a rotary machine. Various embodiments of the invention monitor clearance between a rotatable member and a stationary member of the rotary machine. Clearance generally refers to a measure of the distance between the rotatable member and the stationary member. In order to monitor clearance, a flex circuit capacitance sensor may be provided, in accordance with an embodiment of the invention. The flex circuit capacitance sensor refers to a capacitance sensor that may have a flexible circuit assembly. For the purposes of this disclosure, the term "flex circuit capacitance sensor," may be used interchangeably with the terms "capacitance sensor," "water gap sensor" and "air gap sensor". The flex circuit capacitance sensor may include at least one capacitance sensing layer, at least one shielding layer adjacent to the capacitance sensing layer, at least one ground layer adjacent to the shielding layer, and a set of conducting leads coupled to the capacitance sensing layer. Further, in accordance with an embodiment of the invention, the capacitance sensor may be mounted anywhere between a portion of the rotatable member and a portion of the stationary member. Finally, in accordance with an embodiment of the invention, clearance may be determined between the rotatable member and the stationary member based on a capacitance indication from the capacitance sensor.

Rotary machines are utilized in a variety of power generation and energy conversion applications. A rotary machine in general may include a stationary or fixed member enclosing a rotatable member. The rotatable member utilizes an action (either by a reaction force or an impulse) of a fluid such as water and hot gases on it for rotation. In a conventional rotary machine such as turbine the rotatable member is a set of turbine blades which are circumferentially surrounded by a stationary shroud. Similarly, in case of an electric or hydro-electric generator, the rotatable member is a rotor and the stationary member is a stator.

FIG. 3 is a schematic representation of an example system for clearance monitoring in a rotary machine according to one embodiment of the invention. The turbine 300 includes a shaft 304 that connected to the generator 302. In the operation of the turbine 300, the water may be fed from wicket gates 310 of the turbine 300 at high pressure. As the water flows down the turbine 300, the pressure decreases and hence a low pressure may be achieved below turbine blades 312.

The turbine 300 may further include a sensor 306 that is installed on shroud walls 314 to measure a clearance between the shroud walls 314 and the turbine blades 312. The sensor 306, which may be a capacitance sensor, is formed on a flexible substrate or flex circuit in accordance with an embodiment of the invention. Since the sensor 306 is built on the flex circuit, it is hereinafter interchangeably referred to as flex circuit capacitance sensor. The flexible substrate may be a polyimide and a plastic (for example, a Kapton® substrate). Different types of flex circuits may include, but are not limited to, flex, rigid-flex and flex coils. The flex type circuit is a flexible version of printed circuit board (PCB) with unique capabilities. Flex circuits offer similar characteristics of a PCB: namely repeatability, reliability, and high density but with added flexibility, vibration resistance and reduced thickness Moreover, being flexible, the sensor 306 will conform to the curvature of the shroud walls 314.

In an embodiment of the invention, the sensor 306 is a thin layered sensor, where the thickness of the sensor 306 may be approximately 15 mils (381 microns) or greater. Since the sensor 306 is relatively thin, it will minimize any interference with the flow of water and thus there will be reduced cavitation in the water near the end of the turbine blades 312. Moreover, in this case, since the sensor 306 is relatively thin and soft, even if the sensor 306 peeled away from the shroud walls 314 during operation, the sensor 306 may get crushed and the remaining parts of the sensor 306 may get ejected, but the turbine 300 or the shroud walls 314 would not be damaged.

According to an embodiment of the invention, the sensor 306 may generate an indication of the clearance between the turbine blade tips and the shroud wall. In an embodiment of the invention, epoxy glue or sealant may be used to attach and secure the sensor 306 to the shroud walls 314. Further, the sensor 306 may be sealed so as to make the sensor 306 watertight. The thin and flexible structure of the sensor 306 helps in overcoming various limitations of the existing solutions. Generally, capacitance sensor dimensional measurement requires three basic components: a probe that uses changes in capacitance to sense changes in distance to the target (i.e., clearance in this case), driver electronics to convert these changes in capacitance into voltage changes, and a device to indicate and/or record the resulting voltage change.

In an embodiment of the invention, the thin sensor 306 may have an integrated cable in order to eliminate the need for a connector in close proximity with the sensor region. The integrated cable may be about 10-15 meters long. The cable from the sensor 306, may be attached to the shroud wall 314 and may pass through an exit hole 318 in the low pressure region of the turbine. The exit hole 318 may be drilled through the shroud wall 314 to allow the cable to route to a monitoring system 316 (functioning similar to the functioning of the monitoring system 118) that is located outside (or remote from) the turbine 300. By positioning the cable exit hole 316 in the low pressure portion of the turbine, (below the turbine blades 312), the potential for water leakage is reduced. The portion of the cable below the sensor region 306 may be cut to length, crimped, and connected directly to the monitoring system 316, or it may connectorized and attached to a more suitable cable for feeding through the exit hole 318, and extending to the monitoring system 316. For example, the cable from the sensor may be flat and may conform to the shroud wall and may transition (via a connector or other means) from flat to round for passing through the exit hole 318. Furthermore, shielding and/or grounding can be utilized in the cable to reduce or eliminate stray capacitance or sensitivity to portions of the cable that are in close proximity with the shroud. This cable may send the clearance signals generated by the sensor 306 to the monitoring system 316. In an embodiment of the invention, at least one capacitance measurement circuit connected to the sensor 306 may be used to output the clearance measurement.

FIG. 4 is a diagrammatic representation of an example sensor system 400 with different sensor layers according to an illustrative embodiment of the invention. The sensor layers may be a plurality of flexible layers, in accordance with an embodiment of the invention. In an embodiment of the invention, the example sensor system 400 may be mounted on a mount surface 402. The mount surface 402 may be either a surface of a shroud wall or a surface of a turbine blade. The present embodiment considers the shroud wall as the mount surface 402.

The example sensor system 400, which represents different layers of a flex circuit capacitance sensor, includes four basic layers: a capacitance sensing layer 404, active shielding layers 406a and 406b adjacent to the capacitance sensing layer 404, ground layers 408a and 408b adjacent to the active shielding layers 406a and 406b, and insulating layers (not shown). In an embodiment of the invention, the layers may be made of flex circuit material comprising copper conductive regions. In an embodiment of the invention, all conductive layers may be separated by insulating layers Further, portions of each layer can be conductive in nature and other portions may be electrically isolated from each other.

The active shielding layer 406, which is located inside the ground layer 408, is positioned in a manner to divide the shielding layer 406 into two parts: namely a left portion represented by a shielding layer 406a and a right portion represented by a shielding layer 406b. Although only one pair of the shielding layer 406 (i.e., 406a and 406b) is represented in the FIG. 4, a plurality of shielding layers may be used. The conductive pattern of these shielding layers may be either solid or closely spaced grooves (for example, combing) may be created to minimize eddy currents on the layers. The active shielding layer 406 shields the capacitance sensing layer 404 from the ground layer 408 and from the electrical disturbances on surfaces behind the flex circuit capacitance sensor. The active shielding layer 406 is electrically connected to the monitoring system 316, which applies a voltage signal to the active shielding layer, typically to eliminate any voltage potential between the sensor pad region 410 and the active shielding layers 406.

The ground layer 408, which is the outermost layer, is positioned in a manner to divide the ground layer 408 into two parts, namely a left portion represented by a ground layer 408a and a right portion represented by a ground layer 408b. The ground layer 406 may provide additional shielding from surfaces behind the flex circuit capacitance sensor.

The capacitance sensing layer 404 is used to measure capacitance across the clearance between the turbine blade and the shroud wall. In an embodiment of the invention, the flex circuit capacitance sensor may determine clearance based on this measured capacitance. In FIG. 4, the capacitance sensing layer 404 is defined by a pad. The pad may include a capacitance sensor pad region 410, which is surrounded by a non-conductive region 412. The capacitance sensor pad region 410 may be a conducting region used for clearance measurement, and the non-conductive region 412 electrically insulates the capacitance sensing layer 404 from the shielding layer 406a. The non-conductive region 412 may be further surrounded by a ground region 414. The ground region 414 refers to a portion of the pad that is connected to a ground.

The shielding layer 406 and the ground layer 408 are stacked with the capacitance sensing layer 404 and laminated together to form the flex circuit capacitance sensor. In order for the capacitance sensing layer 404 to sense the clearance, the capacitance sensing layer 404 needs to have a clear view of a target (i.e., a surface 415 of the turbine blade). Thus, in accordance with an embodiment of the invention, two non-conductive window regions may be defined, one each at the shielding layer 406b and the ground layer 408b. A non-conducting window defined in the shielding layer 406b is represented by a window 416, and a non-conducting window defined in the ground layer 408b is represented by a window 418. The windows 416 and 418 may be non-conducting flex circuit carrier material. The windows 416 and 418 are created such that the capacitance sensing layer 404 can sense the proximity of the turbine blades, or the rotating member.

FIG. 5 is a schematic representation of an example sensor system 500 with attached conducting leads according to an illustrative embodiment of the invention. FIG. 5, which is an extension representation of FIG. 4, depicts an embodiment of the electrical connections among the ground 512, 518, active shielding 514, and sensor 516 layers. According to an aspect of the invention, conducting leads used to connect the flex circuit capacitance sensor to a device may be integrated within the flex circuit capacitance sensor, thereby removing the need of a connector. However, even in case the connector is required, it can be built on the flex circuit comprising the sensor, in accordance with an embodiment of the invention. Moreover, as shown in the FIG. 5, first vias 502 may be fused to connect a shielding layer 514a to a shielding layer 514b and second vias 504 may be used to connect a ground layer 512a to a ground layer 512b. Similarly, third vias 520 may be used to connect the shielding layer 514a to a ground region 518 and fourth vias 522 may be used to connect the ground layer 512b to the shielding layer 514b.

Three outputs, one each from the ground layers 512a, 512b and 518, a capacitance sensing layer 516 and the shielding layers 514a and 514b may be routed to the capacitance measurement circuit 510 using a set of conducting leads 506a, 506b and 506c, respectively. The conducting leads 506a, 506b and 506c that further extends towards a low pressure area of a turbine may be crimped using a crimping tool, for example. These leads may run through a round triaxial cable 508, for example. The triaxial cable 508 may be used to connect the flex circuit capacitance sensor to any other device such as a monitoring system and/or a capacitance measurement circuit 510, for example. The capacitance measurement circuit 510 may be a circuit that is used to output clearance measurement. According to an aspect of the invention, the conducting leads 506a, 506b and 506c may be integrated with the flex circuit capacitance sensor on the flex substrate. According to another aspect of the invention, the conducting leads 506a, 506b and 506c may be mounted to a surface (i.e., a portion) of the shroud wall and may extend to a low pressure area of the turbine (i.e., area below the turbine).

FIG. 6A is a schematic representation of an example sensor system 600a where a flex circuit capacitance sensor may be applied to a flat mounting surface according to an illustrative embodiment of the invention. In this embodiment, the mounting surface of shroud walls on which the flex circuit capacitance sensor may be applied is flat. Thus, a flex substrate 602 on which the flex circuit capacitance sensor pad region 604 may be formed is made flat so that surface profile of the flex circuit capacitance sensor conforms to the flat mounting surface. In an embodiment of the invention, capacitance sensor pad region 604 and conducting lead assembly region 606 may be integrated on the flex substrate 602. In an embodiment of the invention, conducting lead assembly region 606 may be extended to the space where cables are connected to the flex circuit capacitance sensor.

FIG. 6B is a schematic representation of an example sensor system 600b where a flex circuit capacitance sensor may be applied to a curved mounting surface according to illustrative an embodiment of the invention. In this embodiment, the mounting surface of shroud walls on which the flex circuit capacitance sensor may be applied is curve shaped. Thus, a flex substrate 608 on which the flex circuit capacitance sensor pad region 610 may be formed has a curved surface profile so that the flex circuit capacitance sensor conforms to the curved mounting surface. In an embodiment of the invention, the conducting lead assembly region 612 and capacitance sensor pad region 610 may be integrated on the flex substrate 608.

FIG. 7 is a schematic representation of an example turbine system 700 having a plurality of sensors according to an illustrative embodiment of the invention. Embodiments of the invention may include any number of sensors that may be used in a turbine to monitor clearance. The example turbine system 700 may include a shaft 702 on which a number of blades may be mounted. As shown in the FIG. 7, sensors 704 and 706 may be used in the example turbine system 700. In FIG. 7, each of the sensors 704 and 706 is formed on a flexible substrate. The sensors 704 and 706 are mounted on surfaces of turbine blades. Features and functionalities of the sensors 704 and 706 are same as that of the sensor 306. Thus, the sensors 704 and 706 measure a clearance between a turbine blade 708 and 710 and the shroud wall 712 in one or more positions around the shroud wall 712.

The example turbine system 700 may further include turbine blades 714 and 716. In an embodiment of the invention, the turbine blades 708, 710, 714 and 716 may partially overlap each other. Surfaces on the shroud wall 712 may also include sensors similar to the sensors 704 and 706. One of these sensors may measure clearance between the turbine blade 714 and the shroud wall 712, and the other sensor may measure clearance between the turbine blade 716 and the shroud wall 712, as the blades are stationary, or as the turbine assembly is rotating.

FIG. 8 is a schematic representation of an example sensor mounted on top of a turbine shaft bearing surface according to an illustrative embodiment of the invention. The system shown in the FIG. 8 is an example turbine system 800 connected to a generator 802. In the example turbine system 800, a flex circuit capacitance sensor 820 may be used to measure a clearance 804 between turbine blades 806 and shroud walls 808. The example turbine system 800 may further include a shaft 810 that connects the example turbine system 800 to the generator 802. The example turbine system 800 may further include an additional sensor 814 mounted on top of a bearing 816 near the shaft 810. The additional sensor 814 may be used to measure the vertical movement of the shaft 810, according to an embodiment of the invention. The additional sensor 814 may be a flex circuit capacitance sensor, in accordance with an exemplary embodiment of the invention. Further, in an embodiment of the invention, a horizontal surface 818 may be provided on the shaft 810 to measure the movement of the shaft 810.

FIG. 9A is a schematic representation of an example of two split rings 902 and 904 to be mounted on a shaft according to an illustrative embodiment of the invention. The split rings 902 and 904 may be bolted together over the shaft, for example, the shaft 810 shown in the FIG. 8, to form member 818, which is easily attached to the shaft 810, and which provides a horizontal sensing surface for sensor 814 in FIG. 8. In an embodiment of the invention, the split rings 902 and 904 may be screwed or welded on the shaft. The rings 902 and 904 when joined together forms a ring shaped surface that is illustrated in FIG. 9B.

FIG. 9B is a schematic representation of an example of the split rings 902 and 904 to be mounted on a shaft (for example, the shaft 810) according to another illustrative embodiment of the invention. The split rings 902 and 904 are bolted together to form a ring 906. The ring 906 is arranged on the shaft in such a way that the ring 906 provides the horizontal surface on the shaft. In an embodiment of the invention, sensor 814) may sense the proximity of the surface of the ring 906 to measure the up and down movement of the shaft.

FIG. 10 is a schematic representation of an example rotor-stator assembly 1000 according to an illustrative embodiment of the invention. Similar to the turbine system explained above, a flex circuit capacitance sensor 1010 (similar to the sensor 306) may be used to measure an air clearance 1002 between a rotor 1004 and a stator 1006 in the example rotor-stator assembly 1000. According to an exemplary embodiment of the invention the air clearance 1002 may range from about 3 millimeter to about 50 millimeters. In an embodiment of the invention, the flex circuit capacitance sensor 1010 may be mounted either on the rotor 1004 or the stator 1006. As shown in FIG. 10, the flex circuit capacitance sensor 1010 is mounted on an end of a rotor pole 1008 to measure the air clearance 1002. Since the flex circuit capacitance sensor 1010 is relatively thin and light weight, the flex circuit capacitance sensor 1010 may not add significant mass to the end of the rotor pole 1008.

FIG. 11 is an end view of one example of a sensor system 1100 mounted on a rotatable member or a stationary member in accordance with an illustrative embodiment of the invention. The sensor system 1100 includes a flex circuit substrate 1102 on which a flex circuit capacitance sensor may be formed. As shown in the FIG. 11, the sensor system 1100 is mounted on a surface of the rotatable member or the stationary member. According to an embodiment of the invention, a sealant 1104 and/or a mounting adhesive attaches the sensor system 1100 to the surface and provides a smooth profile transition from the surface to top of the sensor system 100.

The value of ranges given in the above embodiments are only for exemplary purposes and are not intended to limit or deviate the scope of the invention.

FIG. 12 is a flowchart illustrating one example of a method 1200 for monitoring clearance between a rotatable member and a stationary member in a rotary machine in accordance with an embodiment of the invention. The rotary machine may be either a turbine or a rotor-stator assembly, for example. In one aspect of the invention, when the turbine is used as the rotary machine, the stationary member may be a turbine shroud (i.e., shroud wall of the turbine) and the rotatable member may be a turbine blade. The following steps may be mechanical in nature and may be carried out and/or performed by any machining technique and/or combination of machining techniques as desired in various embodiments of the invention.

The method 1200 may begin at block 1202, in which a flex circuit capacitance sensor is provided. The flex circuit capacitance sensor refers to a capacitance sensor formed on a flex circuit (or substrate). In one aspect of the invention, the capacitance sensor and the flex circuit together may form a flexible circuit assembly. The flex circuit capacitance sensor may include active shielding layers, ground layers, conducting leads and a capacitance sensing layer. The shielding layers may be arranged adjacent to the capacitance sensing layer, and the ground layers may be arranged adjacent to the shielding layers, in accordance with an embodiment of the invention. Further, the conducting leads may be connected to the capacitance sensing layer in accordance with an embodiment of the invention.

Block 1202 is followed by block 1204, in which the shielding and ground layers are non-conductive regions located between the capacitance sensing layer and the rotary machine member that is measured for clearance. In an embodiment of the invention, the capacitance sensing layer may include a capacitance sensor pad region, which is surrounded by a non-conductive region. The capacitance sensor pad region may be a conducting region used for clearance measurement, and the non-conductive region electrically insulates the capacitance sensing layer from the shielding layer. The non-conductive region may be further surrounded by a ground region.

Block 1204 is followed by block 1206, in which the capacitance sensor may be mounted between a portion of the rotatable member (i.e., a first portion) and a portion of the stationary member (i.e., a second portion). The first portion may be a surface of the rotatable member and the second portion may be a surface of the stationary member. According to an embodiment of the invention, the capacitance sensor may be water and/or air sealed to either the rotatable member or stationary member. In one aspect of the invention, a sealant may be applied adjacent to the portion of the capacitance sensor and stationary member.

Block 1206 is followed by optional block 1208, in which additional flex circuit capacitance sensors (interchangeably referred to as plurality of sensors) may be mounted at respective locations between the stationary member and rotatable member. In an exemplary embodiment of the invention, one first flex circuit capacitance sensor may be mounted on the surface of a turbine shroud, while second flex circuit capacitance sensor may be mounted on the surface of the turbine shroud, but separated by ninety degrees from the first flex circuit capacitance sensor. In one aspect of the invention, the plurality of sensors may be connected to capacitance measurement circuits to provide multiple respective clearance measurements. Multiple respective clearance measurements refer to a number of clearance measurements taken by each of the plurality of sensors. In one aspect of the invention, the capacitance measurement circuit is used to output multiple clearance measurements.

Block 1208 is followed by block 1210, in which the flex circuit capacitance sensors conform to the mounting surface. In an exemplary embodiment of the invention, when the shape of the surface on which the capacitance sensor is mounted is curved, then the flexible circuit of the capacitance sensor is molded into a curved shape so that the capacitance sensor fits on the mounting surface. In one aspect of the invention, the flex circuit capacitance sensor may conform to the portion or surface of the stationary member.

Block 1210 is followed by optional block 1212, in which the conducting leads of the capacitance sensor may route to a low pressure area of the rotary machine. In an exemplary embodiment of the invention, the low pressure area refers to space below a turbine (rotary machine). In one aspect of the invention, conducting leads may connect the capacitance sensor to the capacitance measurement circuit. According to another aspect of the invention, the conducting leads may be mounted to a portion or surface of the stationary member. In an exemplary embodiment of the invention, when the capacitance sensor is mounted to a turbine shroud, the conducting leads may be mounted on a sidewall of the turbine shroud. In an embodiment of the invention, the conducting leads may be cables running down the turbine, i.e., towards the low pressure area side of the turbine. In an embodiment of the invention, the conducting leads may be cables that pass through a hole in the shroud wall, and the cables may have additional shielding or ground layers to eliminate stray capacitance or unwanted sensitivity of the clearance measurement that may be affected by portions of the cable that are running adjacent to the shroud wall, or through the hole in the shroud wall.

Block 1212 is followed by block 1214, in which the capacitance sensor may determine clearance between the rotatable member and stationary member. In an exemplary embodiment of the invention, the capacitance sensor may determine clearance between a shroud wall and a turbine blade. In another exemplary embodiment of the invention, the capacitance sensor may determine clearance between a rotor pole and a stator. In one aspect of the invention, magnitude of the clearance may be determined based on a capacitance indication from the capacitance sensor. The clearance may be determined using the following standard formula for capacitance, C:

$$C = (Area \times Dielectric) \div Gap$$

Dielectric in the above formula refers to a material present in a gap between the rotatable member and stationary member. In an exemplary embodiment of the invention, when the turbine is used as the rotary machine, water present in the gap acts as the dielectric material. In another exemplary embodiment of the invention, when the rotor-stator assembly is used as the rotary machine, air present in the gap acts as the dielectric material. Also, the area refers to the overlap size of the rotatable member and the capacitance sensor pad area.

Block 1214 is followed by optional block 1216, in which a clearance measurement between the rotatable member and stationary member is utilized as feedback to operate the rotatable member. In an exemplary embodiment of the invention, an operator of the rotatable member may determine clearance between the rotatable member and stationary member to be greater than a pre-defined range of minimum and maximum clearance, and hence may perform actions to reduce this clearance. Alternatively, in another exemplary embodiment of the invention, the operator may determine the clearance to be smaller than the pre-defined clearance, and hence may perform actions to increase this clearance.

The operations described in the method 1200 of FIG. 12 do not necessarily have to be performed in the order set forth in FIG. 12, but instead may be performed in any suitable order. Additionally, in certain embodiments of the invention, more or less than all of the elements or operations set forth in FIG. 12 may be performed.

Monitoring clearance in a rotary machine by a flex circuit capacitance sensor helps in increasing the overall performance and efficiency of the rotary machine. Moreover, use of flexible sensor design reduces the risk of the sensors getting damaged due to high pressure fluid/air flowing in the rotary machine. Further, due to thin sensor design, the sensor can be mounted on any shape and size of a surface. Since there is no need to drill holes through the shroud wall where the sensor needs to be installed, the installation is easier and less time consuming. Finally, the flex circuit capacitance sensors may be used in underwater areas with high turbulence.

Embodiments of the invention are described above with reference to block diagrams and schematic illustrations of methods and systems according to embodiments of the invention.

Certain embodiments of the invention are applicable for any device, which require a capacitance sensor. The flex circuit capacitance sensor explained above may be a component used in applications such as, but not limited to, power generators and energy converters. It will be apparent that any example taken provided in the foregoing specification is merely provided for explanation purposes and does not limit the scope of the invention by any means.

While the invention has been described in connection with what is presently considered to be the most practical and various embodiments, it is to be understood that the invention is not to be limited to the disclosed embodiments, but on the contrary, is intended to cover various modifications and equivalent arrangements included within the scope of the appended claims.

This written description uses examples to disclose embodiments of the invention, including the best mode, and also to enable any person skilled in the art to practice the invention, including making and using any devices or systems and performing any incorporated methods. The patentable scope of embodiments of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. An apparatus for monitoring clearance between a turbine blade and a stationary member in a turbine, the apparatus comprising:
   a flex circuit capacitance sensor mounted to a surface of one or more turbine blades, the sensor comprising a plurality of flexible layers, the layers comprising:

at least one capacitance sensing layer;

at least one shielding layer adjacent to the at least one capacitance sensing layer;

at least one ground layer adjacent to the at least one shielding layer; and at least one flat integrated conducting lead assembly to provide communication between the flex circuit capacitance sensor and remote measurement circuitry.

2. The apparatus of claim 1, wherein the shielding and ground layers comprise non-conductive regions between the capacitance sensing layer and the turbine blade.

3. The apparatus of claim 1, wherein the at least one conducting lead comprises:

at least one layer comprising at least one conducting trace, electrically connected to the at least one capacitance sensing layer;

at least one conducting layer;

at least one ground layer;

at least one insulating layer; and a plurality of vias to connect the at least one ground and the at least one shielding layer.

4. The apparatus of claim 1, wherein the flex circuit capacitance sensor comprises one or more active shielding layers, and wherein the flex circuit capacitance sensor conforms with at least a portion of the turbine blade.

5. The apparatus of claim 1, wherein the at least one ground layer and the at least one shielding layer cover at least a portion of the capacitance sensing layer where the flex circuit capacitance sensor is routed along the turbine blade.

* * * * *